United States Patent [19]

Kerlin et al.

[11] Patent Number: 5,178,773
[45] Date of Patent: Jan. 12, 1993

[54] HIGH EFFICIENCY FILTER TO REMOVE SUSPENDED SOLIDS FROM AQUEOUS MEDIA

[75] Inventors: Daniel E. Kerlin, Kewaskum; Thomas G. Drews, Germantown; George F. Rische, Nashotah, all of Wis.

[73] Assignee: Briggs & Stratton Corporation, Milwaukee, Wis.

[21] Appl. No.: 785,537

[22] Filed: Oct. 31, 1991

[51] Int. Cl.⁵ ............................................. E01D 21/02
[52] U.S. Cl. .................................. 210/724; 210/749; 210/804
[58] Field of Search ............... 210/532, 749, 723, 724, 210/725, 767, 791, 798, 797, 800, 804, 805, 806

[56] References Cited

U.S. PATENT DOCUMENTS

| | | |
|---|---|---|
| 3,899,419 | 8/1975 | Emmanuel . |
| 4,014,767 | 3/1977 | Schmidt . |
| 4,025,430 | 5/1977 | Pagel . |
| 4,053,386 | 10/1977 | Schmidt . |
| 4,189,381 | 2/1980 | Laferty et al. . |
| 4,923,600 | 5/1990 | Krofta . |

FOREIGN PATENT DOCUMENTS 962583  3/1948  France .

Primary Examiner—Frank Sever
Attorney, Agent, or Firm—Andrus, Sceales, Starke & Sawall

[57] ABSTRACT

A high efficiency filter medium is placed in series with a water treatment clarification system for receiving the treated effluent discharged from the clarifier. The treated water is passed through the high-efficiency filter media for reducing the suspended solid constituent of the water to less than 10 ppm. The filter is supported in a open mesh carrier tray and is made of a polyester material adapted for collecting and entrapping the solid suspended particles in the clarified water discharge.

8 Claims, 3 Drawing Sheets ns," issued to F. Schmidt on Oct. 11, 1977, discloses an electrolytic filter which includes perforated electrodes wherein the flocculents are charged and then attracted to and trapped by the filter. U.S. Pat. No. 4,189,381 entitled "Waste Water Treatment," issued to J. Laferty, et al. on Feb. 19, 1980, discloses an electrolytic filter which includes perforated conducting electrodes where in the flocculents are charged and then trapped by the filter. U.S. Pat. No. 4,923,600 entitled "Water Clarification System Adapted For Removing Particulate Matter of Greater than a Predetermined Size," issued to M. Krofta on May 8, 1990, discloses a system where the flocculent is in an electroflotation state and may be removed by skimming.

HIGH EFFICIENCY FILTER TO REMOVE SUSPENDED SOLIDS FROM AQUEOUS MEDIA

BACKGROUND OF THE INVENTION

1. Field of the Invention

This invention is related to water clarifying systems in general and is specifically directed to a high efficiency filter for mechanically removing suspended solids and fine particles from an aqueous media to obtain a clear effluent.

2. Description of the Prior Art

In many water/wastewater treatment operations, there are standardized quality criteria to be met by the treatment process as well as the equipment involved. These criteria limit the final content of a constituent or pollutant in terms of concentration and the limit on total suspended solids (TSS) for clarity. The TSS desirable is usually limited to a zero-10 ppm range. It is common to find the pollutant discharge in form of suspended solids.

Typically, filters are employed to achieve the above objectives if a mechanical clarifier or gravity settling system cannot meet the stated limits. A variety of filters have been in use for many years, with several types having been developed over the last twenty years. In particular, sand and gravel filters, fine sand filters, charcoal/activated carbon/anthracite filters, diatomaceous earth filters and filament wound/paper/cloth or bag-type filters have been used with varying degrees of success to reduce the TSS in an aqueous media as a post-clarification process. In some cases, these filters are used in combination to further improve results.

Most of the filter systems of the prior art depend on a hydraulic gradient to provide filtration and, once the pressure loss is too high for satisfactory operation, a backwash system is required to restore the filter to operating condition. In many cases, restoration can be achieved only by complete replacement of the filter media. The backwash system for restoring filter capacity calls for a supply of clean filtrate or a clean water source, a pump, instrumentation and a control system to accomplish the task. The backwash cannot be discharged into the sewer if the constituents or pollutants being removed are regulated by effluent guidelines in the same manner as the main wastewater treatment operation.

If replacement of the media is the chosen method of restoring filtration capacity, the cost involved is usually quite high. The media disposal also poses a problem for many industries as regulations become applicable to the waste media product.

Pressure filter systems impose similar restrictions on cost, space and resource requirements and, in the case of diatomaceous earth filters, create the largest quantity of solid waste disposal problem for any filter use.

Examples of mechanical or pressure type filter systems of the prior art are illustrated in a number of U.S. patents. By way of example, U.S. Pat. No. 4,014,767 entitled "Self-Contained Waste Disposal System Including Self-Cleaning Filter," issued to F. Schmidt on Mar. 29, 1977 shows a series of absorbent plates for wastewater treatment, but it is strictly a gravity system. U.S. Pat. No. 4,025,430 entitled "Removal of Metal Ions From Waste Water," issued to R. Pagel on Mar. 24, 1977, is directed to removal of metal ions from wastewater by adjusting the pH. U.S. Pat. No. 4,053,386 entitled "Electrolytic Filter for Electrolytically Filtering and Recovering Metals From Colloidal Suspen-

SUMMARY OF THE INVENTION

The present invention is directed to a high efficiency filter media which may be readily added to any clarification system, after installation, with a minimum of modification and expense. The filter is unique in its adaptability to various shapes and sizes of clarifying devices without requiring expensive or elaborate mechanical design changes. The filter system of the subject invention is highly desirable for removing heavy metals and toxic substances suspended in wastewater. The filter of the present invention is effective for removing a wide range of particles at high efficiency, providing a filter life that is much longer than traditional gravity, pressure, cartridge, septum or membrane type filters. The filter system of the present invention is much more efficient than wire stringers and cloth screens previously used to remove particulate matter from a flowing aqueous stream.

The filter of the subject invention does not require any backwash system, any additional flow systems or any elaborate control mechanisms generally required with filter systems of the prior art. It, therefore, eliminates the need for pumping, supplying and collecting backwash waters, and the resulting disposal of large quantities of liquid and/or solid waste. In this connection, it will be understood that the subject invention eliminates flow, pressure and level control devices normally required to monitor, regulate and operate a post filter system used in combination with clarification equipment. The space and expense required to install and maintain such systems is virtually eliminated.

The filter system of the subject invention comprises a mechanical filter including a filter media interposed between the exit port of a typical clarifier and a typical drain or sewer outlet. The filter system is a high efficiency gravity filter which can perform at rates ranging from 4 gpm/ft$^2$ to over 25 gpm/ft$^2$ based on the influent conditions of the TSS and the particle size. The filter requires no backwash and, therefore, eliminates numerous filter controls and the associated equipment. The filter media can be acquired and replaced at a very low cost. In fact, the cost is a minor fraction for this type of application compared to any other known filter system. The filter of the subject invention does not require any special storage or packaging, conditions unlike sand, gravel, carbon, diatomaceous earth and other similar media of the prior art.

It is an important feature of the subject invention that the filter media can be washed in an appropriate solvent to remove the contaminants by dissolution and detachment. The quantity of solvent required is minimal and, therefore, the problem of waste disposal may be limited to under 30 gallons at a time for filter media ranging up to 10 square feet in functional surface area. In industrial applications involving heavy metals like lead, zinc, chromium, nickel and the like, the solvent can use commonly available mineral acids such as sulfuric, hydrochloric, nitric acids and the like. The filter media may be cleaned and reused several times to reduce the replacement cost associated with use of the system.

When the filter media is not to be reused or is ultimately disposed, it can be air dried at ambient conditions and the waste compacted to a relatively low solid waste volume. Compressibility of this filter media has proven to be a distinct advantage over wet filter media produced by sand, carbon, diatomaceous earth, polyfiber, cotton, or paper cartridge filters.

It is an important advantage of the subject invention that the high efficiency filter does not utilize auxiliary utility sources, and provides a low cost filter system with minimum maintenance requirements. The filter does not need special access equipment to install or remove, but is easily installed, operated and replaced.

The high efficiency filter system of the subject invention consists of a filter media that is placed in a specifically designed filter carrier tray to remove suspended solids in a wastewater stream with a high degree of efficiency. The filter enables mechanical removal of particles from submicron range to larger sizes, with a particularly high efficiency performance for metal hydroxides. The high efficiency filter system yields wastewater quality that meets currently published standards even in the presence of minor upsets in the clarifier, a slug of suspended solids floating in the influent under "blown" conditions or a temperature variation in the aqueous stream being filtered.

In the preferred embodiment, the filter media consists of 100% virgin polyester ranging in thickness from ½ inch to two inches, available in multiple thicknesses under the trade names Polyfloss and Glassfloss in roll form. Similar media used in air dust filtration can also be used in the filter system of the subject invention to achieve the primary objective of removing the TSS from water/wastewater streams. The filter media is resistent to bacterial growth and/or fouling, providing a considerable advantage over known conventional filters using sand, gravel, cloth, paper and similar components with large porous surfaces and intersticial voids.

The filter media of the subject invention is placed in a perforated filter carrier tray that is designed to provide a water-tight seal between the effluent clarifier and the filter system. A gasket is provided to seal uneven surfaces between the clarifier frame and the carrier to assure that all of the influent passes through the post-clarifier filter system as it is removed from the clarifier. During operation, the suspended particles and the effluent are retained by the filter and a clear effluent is obtained and discharged from the downstream side of the filter into the dump or sewer system.

The thickness of the filter can be changed to control particular retention. The used filter media can be removed and placed in a drum or vat filled with appropriate aqueous solvents to dissolve the pollutants or absorb them as agglomerates. After cleaning, the filter media may be replaced in service. In practice, it has been found that the same filter media may be used two to four times or more depending on application.

It is, therefore, an object and feature of the subject invention to provide for a high efficiency filter for removing solid and suspended particulate matter from an aqueous media.

It is a further object and feature of the subject invention to provide for a high efficiency filter which may be retro-fitted to an effluent clarifying apparatus after installation with a minimum of modification and without the addition of any mechanical control systems or the like. The installation of this high efficiency filter can be accomplished in matter of less than eight hours or within a week from the time of initial planning compared to much longer time required to install other conventional filters.

It is yet another object and feature of the subject invention to provide a post-clarifier filter system incorporating a reusable filter media for mechanically removing solid and suspended particulate matter from an aqueous media.

It is yet another object and feature of the subject invention to provide for a high efficiency filter which may be readily cleaned and reused, minimizing filter disposal requirements.

It is an additional object and feature of the subject invention to provide for a high efficiency filter system which relies on a filter media which is readily available, inexpensive, and easy to handle, clean, and dispose.

Other objects and features of the subject invention will be readily apparent from the accompanying drawings and detailed description of the preferred embodiment.

DETAILED DESCRIPTION OF THE PREFERRED EMBODIMENT

Figure 1:
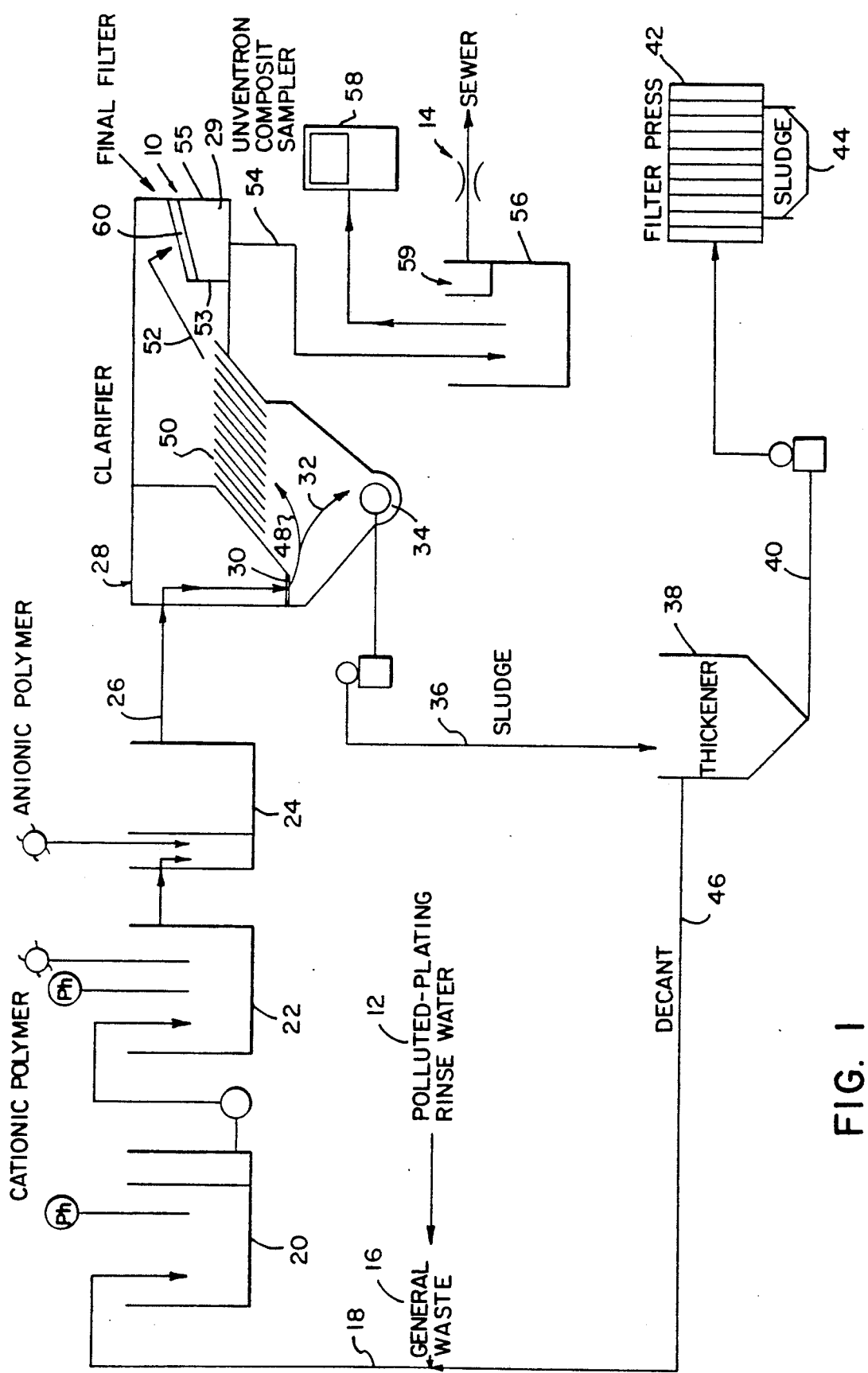
FIG. 1 is a diagrammatic flow diagram of a water clarification system utilizing the high efficiency filter of the present invention.

As shown in FIG. 1, the high efficiency filter system 10 of the subject invention, is used in combination with a typical water clarification system. Basically, wastewater, such as plating rinse effluent, as shown at 12, is introduced into the clarifier system for removing heavy metal contaminants from the wastewater prior to its release into a sewer system as illustrated at 14.

Typically, the polluted rinse water 12 is introduced as general waste at 16 into the inlet flow line 18 of the clarifier system. The wastewater is introduced into a tank 20 for adjusting the pH factor of the wastewater and adding to it a polymer to form flocculents of larger particle size. As is typical, a secondary pH balance tank 22 is in series with the first tank to further assure and adjust pH level of the water/waste solution.

In the preferred embodiment, the clarification system is adapted for removing the contaminants from the wastewaters generated by electroplating and conversion coating lines. Typically, the wastewater includes burnishing waste, batch treatments and the like which comprise small metallic particulate matter and dissolved metals contained in the wastewater as it flows through the system. The wastewater is introduced into pH adjustment in treatment tanks 20 and 22 for precipitating the waste particles and enlarge these solid waste particles to a suitable setting size. The pH is adjusted by a chemical addition to bring the wastewater solution to a pH level of between 8 and 10 pH. As is typical, after the pH has been adjusted and the particles precipitated by use of the polymer as the solution passes through tanks 20 and 22, it is then introduced through another polymer tank 24 from which it is exited as shown at flow line 26 into a clarifier tank 28.

The charged wastewater in flow line 26 is passed through an inlet 30 near the bottom of the clarifier tank, where the heavier enlarged particles settle out by gravity feed, as shown at 32, and are removed from the water carrier as sludge via a centrifugal pump 34, see flow line 36. The sludge is introduced into a sludge collecting tank 38. As the sludge thickens and collects at the bottom of the tank 38, it is removed via line 40 and pumped into a filter press 42, where remaining moisture is removed and the sludge is collected at 44 for disposal. The fluids rising to the top of the sludge tank 38 are decanted from the sludge tank and reintroduced via line 46 back into the clarifier treatment system via line 18.

The lighter particles carried by the wastewater flow naturally upward as indicated by arrow 48 in the clarifier tank 28, as indicated at 48, and flow over a series of spaced, parallel lamella plates 50, where more of the suspended solids are collected from the wastewater and the water flows overs a dam 53, as indicated by the flow path 52, and then through the high efficiency filter system 10 of the subject invention from which the effluent is exited via line 54 into a holding tank 56.

In the preferred embodiment, an Unventron composite sampler 58 is employed for routinely collecting samples from the holding tank 56 to assure the quality and consistency of the wastewater exited from the clarifier on line 54. As the wastewater collects in the holding tank 59, it fills the tank and drains via the overflow 58 into the sewer line 14.

While it has been found that the clarifier system of the type described, without the high efficiency filter 10 of the subject invention, is functional to remove a good portion of the solid particles from wastewater by use of a pH adjusted solution with flocculents to collect the solid waste particles into larger masses which are more easier filtered from the system, there are two conditions which can readily render this system ineffective, whereby the fluids released into the holding tank 56 are rendered unsuitable for disposal through public sewer systems.

The first is when the wastewater treatment system becomes "blown." This occurs typically when the input system, such as an electroplating line, for unpredicted reasons generates an unusually large volume of waste particles or a "slug" into the system, throwing it out of balance and creating a high concentration of solid particulate matter in the waste which cannot be properly treated by the clarifier system. When this occurs, the parallel plates 50 are ineffective for collecting the particulate matter and it is released over the dam 53 into the wastewater holding tank 56 for release into the sewer without proper clarification. Typically when this condition occurs, the prior system must be shut down until the treatment system is brought back into proper balance.

The second condition occurs under normal operating activity. Even the best clarifier system and the most carefully controlled pH adjusted flocculent tanks can only precipitate a reaction of the solid particulate matter from the wastewater. Under current environmental standards, the electromechanical clarifier systems of the prior art often do not sufficiently treat the wastewater to a condition where it can be readily discharged into the public sewers in an environmentally safe manner. Typically, the final content of a constituent limits the said pollutant in terms of concentration and TSS for clarity to a range of zero to 10 ppm range before wastewater may be discharged into the public sewer system. In many cases, the parallel plate-type clarifier system cannot remove particles limited to the acceptable size and concentration range.

While the parallel plate-type clarifier system is adequate for removing all particulate matter in sizes larger than 10 ppm, many systems pass particles in the zero to 10 ppm range. In the past, the adequate removal of the remaining solid particles from the wastewater could be achieved by using sand filters, charcoal/activated carbon/anthracite, multimedia type combining sand and carbon/anthracite, diatomaceous earth filters and filament wound/paper/cloth or bag-type filters. While these filters are often successful in achieving the water quality required for dumping, they greatly increase the cost of installation, operation and maintenance of the clarifier system.

By incorporating the high efficiency mechanical filter 10 of the subject invention in series with the overflow of the dam 53 of the clarifier, it has been found that consistently acceptable water quality can be achieved without the added expense of the filtration systems of the prior art. The mechanical, high efficiency filter of the subject invention is successful in maintaining water quality wherein the waste water consistently contains a solid particulate constituent of less than zero to 10 ppm. The filter is adapted to remove suspended solids in a wide size range extending from submission size to larger agglomerates of over 100 micron size during gravity flow. In the preferred embodiment of the subject invention, the high efficiency filter 10 permits a flow rate of 4 gpm/ft$^2$ to over 25 gpm/ft$^2$ based on influent conditions of TSS and particle size. The filter requires no backwash and, therefore, eliminates the numerous filter controls, piping pump and related equipment associated with the filter systems of the prior art.

The filter media is replaceable at very low cost. In fact, the cost is an almost non-existent factor when compared with the filter systems available in the prior art. The filter media does not requires any unique storage or packaging conditions, unlike sand, gravel, carbon, diatomaceous earth and other similar media of the prior art. The filter media can be washed in an appropriate solvent to remove the contaminants by dissolution and detachment and the quantity of solvent required is minimal. The problem of waste disposal may be limited to under 30 gallons at a time from filter media ranging up to 10 square feet in functional surface area. The filter media may be reused several times.

In the preferred embodiment, the filter media consists of a 100% virgin polyester, ranging in thickness from $\frac{1}{2}$ inch to two inches, available in multiple thicknesses under the trade name Polyfloss and Glassfloss, in roll form. The media and physical characteristics, chemical composition, and filtration capacity is not limited to this trade name. Similar media used in air dust filtration can be used in the high efficiency filter system 10 of the subject invention to achieve the primary objective of removing TSS from waste/wastewater streams. It is resistent to bacterial growth and/or fouling, providing considerable advantage over other conventional filters using sand, gravel, cloth, paper and similar components with a large porous surface as well as intersticial voids.

The particular configuration of the high efficiency filter system of the preferred embodiment is shown in FIGS. 2-5. As there shown, a filter system 10 includes a framework 62 which is placed at the top of the dam 53 (FIG. 1) and is supported between the dam and the outer wall 55 of the clarifier. The filter is adapted for intercepting the flow of the water over the dam and into the exit line 54.

Figure 2:
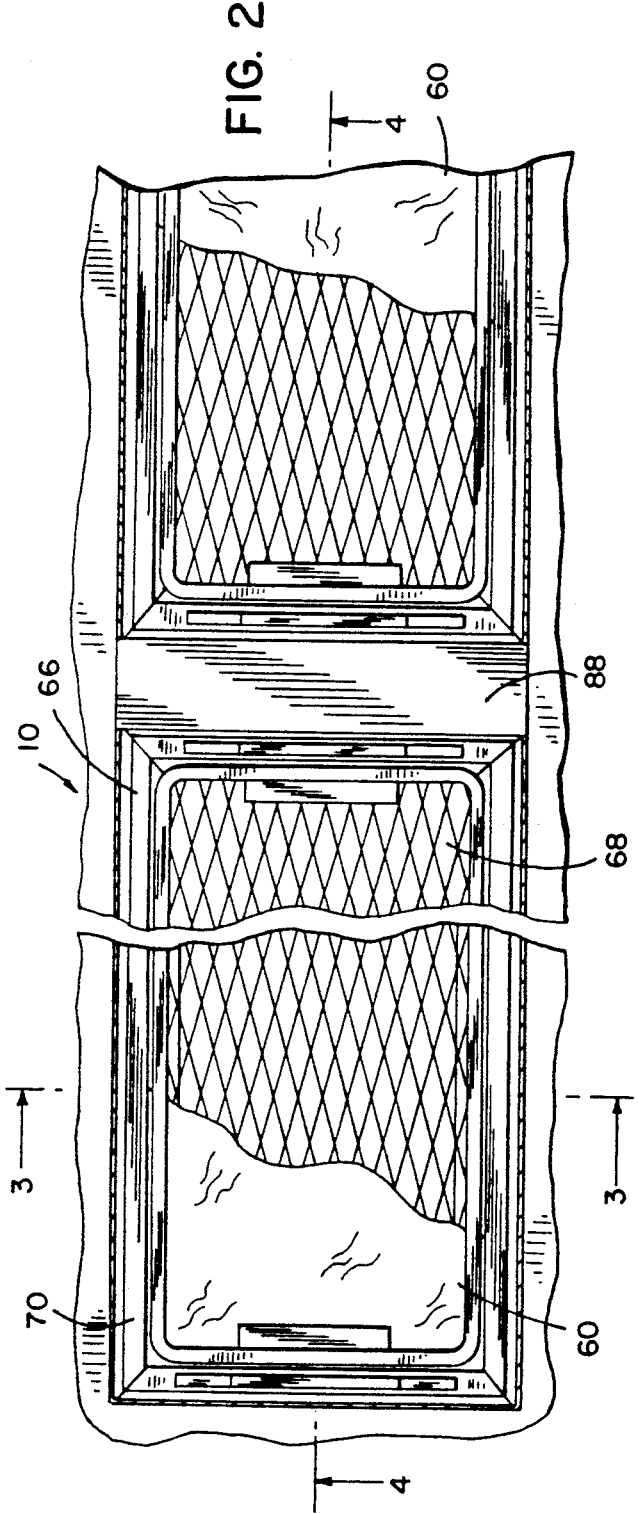
FIG. 2 is a fragmentary view, partially in section, showing the top of the high efficiency filter system and, in particular, the filter carrier of the subject invention.

As shown in FIGS. 2-5, the frame 62 includes a plurality of openings 64, each adapted for receiving a filter carrier tray 66. As is best shown in FIG. 2, the filter carrier 66 includes an open mesh bottom 68 for supporting the filter media 60. An outer peripheral framework 70 is disposed outside the open mesh 68 and closes the perimeter of the opening 64.

Figure 3:
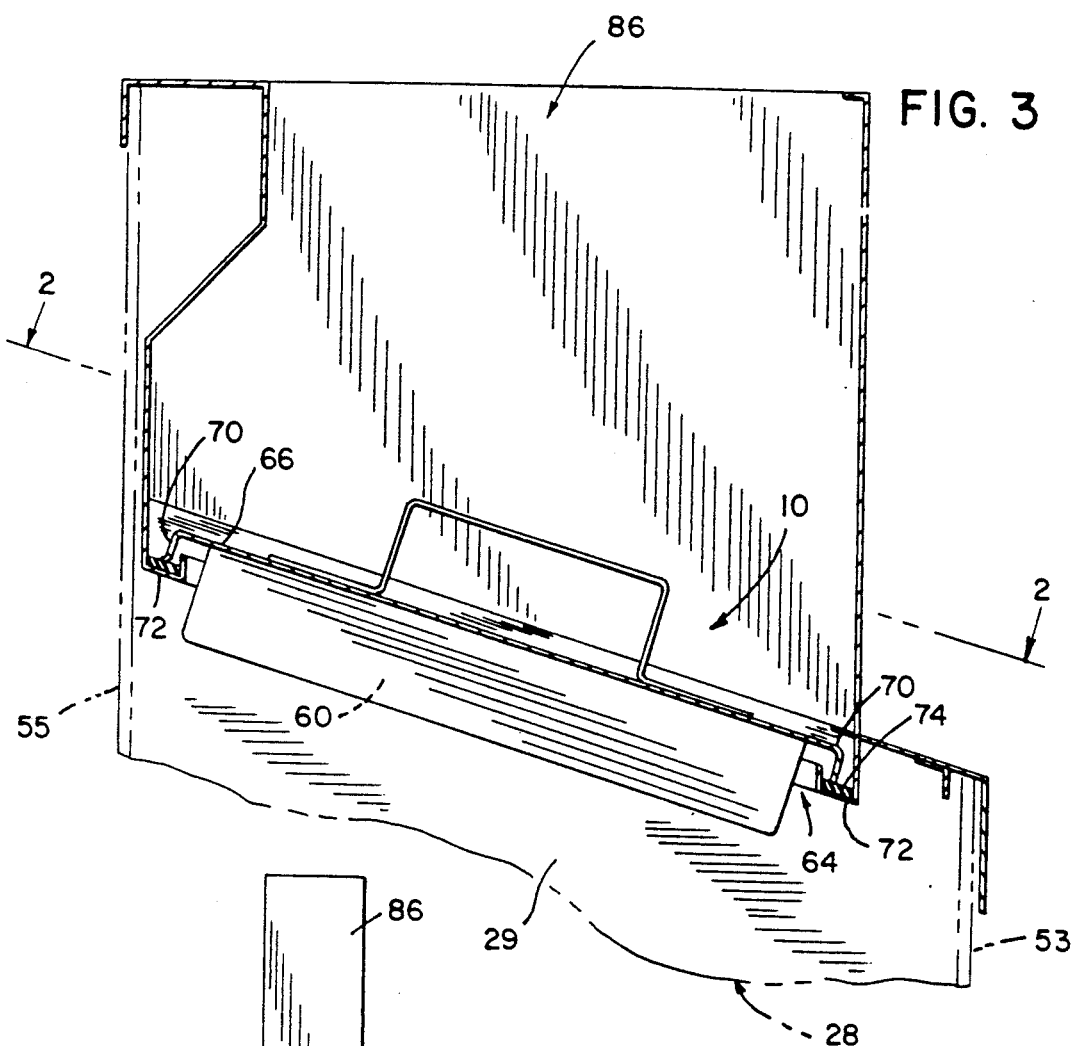
FIG. 3 is a section view taken generally along the line 3—3 of FIG. 2.
Figure 5:
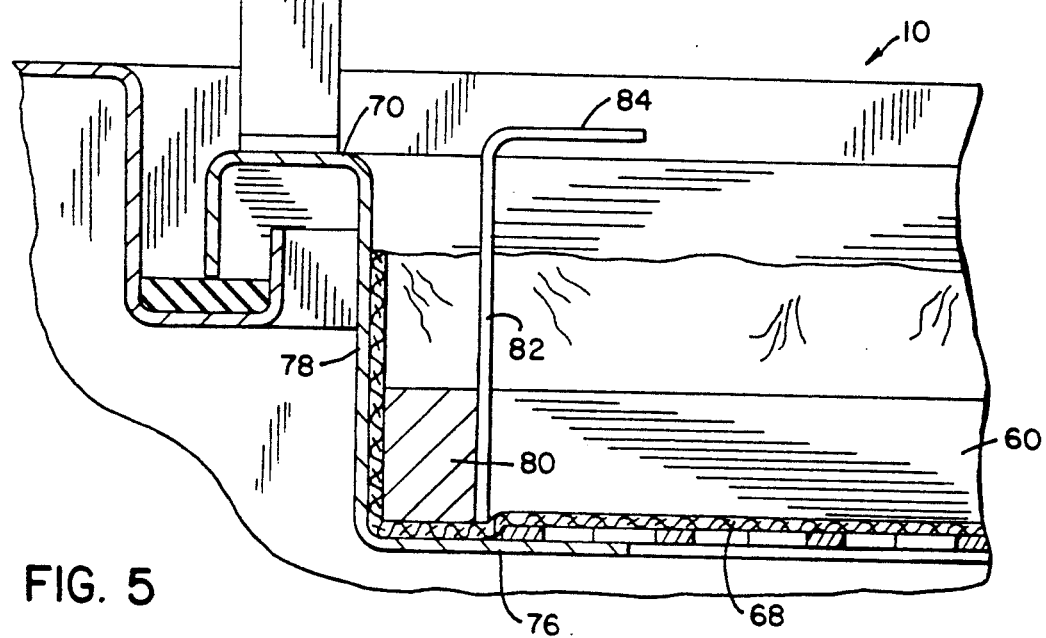
FIG. 5 is an enlarged fragmentary view looking generally in the same direction as FIG. 4.

As shown in FIG. 3, the outer framework rim 70 is adapted to be received in a channel 72 provided in the frame 62 and defining the perimeter of each opening 64. In the preferred embodiment, a resilient seal 74 is placed in the channel 72 for engaging and sealing the framework rim 70 to assure that all fluid flowing over the dam 53 and into the filter system passes through the filter media 60.

The wire mesh bottom of the carrier tray 66 is supported by a lower peripheral wall 76 which is formed into an upstanding sidewall 78 which, in the preferred embodiment, is an integral portion of the rim 70. In the preferred embodiment, a spacer 80 is placed against the screen 68 and along the sidewall 78 of the tray. An upstanding bracket 82 is disposed inwardly of the spacer 80 and includes a horizontally extended tab 84. This assures that the filter media 60 lays in the tray when the tray is lifted and tipped during removal and installation.

For convenience, a plurality of handles 86 may be attached to the rim 70 of the carrier tray to facilitate handling of the tray.

In operation, the filter media 60 is placed in the tray and against the screen bottom 68, and held loosely therein by the brackets 82. The tray may then be passed through the opening 86 in the top of the filter system construction and placed in the channel 72 around each opening 64 to completely surround the opening, whereby any fluids flowing over the dam 53 must flow into the carrier tray 66 and through the filter media 60 before entering the exit chamber 29 of the clarifier.

Figure 4:
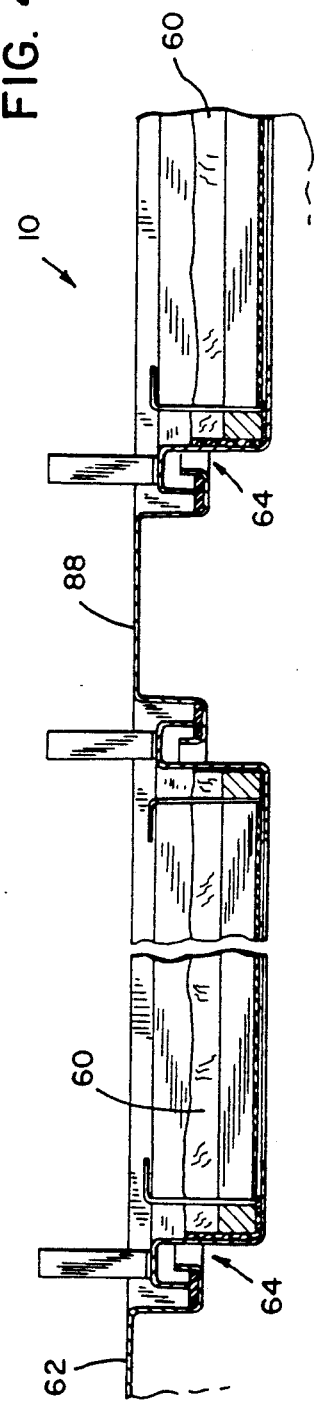
FIG. 4 is a section view taken generally along the line 4—4 of FIG. 2.

In practice, a plurality of trays 66 are associated with the system, each fitting in a complementary opening 64 provided in the frame 62 (see FIGS. 2 and 4). A cross member 88 is provided between the openings 64 to seal the opening between filter trays 66.

While specific embodiments and features of the invention have been shown and described, it will be readily understood that the invention encompasses all modifications and enhancements within the scope and spirit of the appended claims.

What is claimed is:

1. A method for removed suspended solids from a liquid carrier, comprising the steps of:
   a. adjusting the pH of a solution to form suspended solids in a liquid carrier;
   b. directing the suspended solid and liquid carrier through a clarifier;
   c. collecting a portion of the suspended solids as sludge and gravity draining the sludge from the clarifier;
   d. collecting a second portion of the suspended solids on collector plates in the clarifier;
   e. allowing the remaining suspended solids in the liquid carrier to flow upward and outward over a dam and exit from the clarifier; and
   f. thereafter passing the exited suspended particles in the liquid carrier over and through a filter in series with and downstream of the dam to capture a portion of the remaining suspended solids as the liquid carrier gravity feeds through the filter.

2. The method of claim 1, wherein the liquid carrier is water.

3. The method of claim 1, wherein the exited suspended solids and liquid carrier are gravity fed through the filter.

4. The method of claim 1, wherein the filter comprises a virgin polyester mesh.

5. The method of claim 4, wherein the filter is between one-half and two inches in thickness.

6. The method of claim 1, wherein the filter is adapted for reducing the solid constituent in the liquid carrier to less than 10 ppm.

7. The method of claim 1, wherein the filter is adapted to remove suspended solids in a wide size range extending from submicron size to larger agglomerates of over 100 micron size during gravity flow.

8. The method of claim 1, further including the steps of:
   a. removing the filter after it has collected a predetermined quantity of suspended solids;
   b. washing the mechanical filter in a liquid solution adapted for rinsing the collected suspended solids from the filter; and
   c. replacing the filter in series with the dam of the clarifier.

* * * * *